(12) United States Patent
Kunkel et al.

(10) Patent No.: US 10,667,544 B2
(45) Date of Patent: Jun. 2, 2020

(54) BEE FEED PRODUCTS AND METHODS OF USING THE SAME

(71) Applicant: PURINA ANIMAL NUTRITION LLC, Shoreview, MN (US)

(72) Inventors: Grace Kunkel, Kirkwood, MO (US); Kent Lanter, Waterloo, IL (US); James Redhage, Beaufort, MO (US); Bill L. Miller, Labadie, MO (US)

(73) Assignee: PURINA ANIMAL NUTRITION LLC, Arden Hills, MN (US)

( * ) Notice: Subject to any disclaimer, the term of this patent is extended or adjusted under 35 U.S.C. 154(b) by 71 days.

(21) Appl. No.: 15/724,808

(22) Filed: Oct. 4, 2017

(65) Prior Publication Data

US 2019/0098917 A1     Apr. 4, 2019

(51) Int. Cl.

| | |
|---|---|
| *A23K 20/158* | (2016.01) |
| *A23K 20/163* | (2016.01) |
| *A23K 20/111* | (2016.01) |
| *A23K 50/90* | (2016.01) |
| *A23K 20/105* | (2016.01) |
| *A23K 20/147* | (2016.01) |

(52) U.S. Cl.
CPC .......... *A23K 20/158* (2016.05); *A23K 20/105* (2016.05); *A23K 20/111* (2016.05); *A23K 20/147* (2016.05); *A23K 20/163* (2016.05); *A23K 50/90* (2016.05)

(58) Field of Classification Search
None
See application file for complete search history.

(56) References Cited

U.S. PATENT DOCUMENTS

| | | | | |
|---|---|---|---|---|
| 4,296,138 | A * | 10/1981 | Boden .................... | A24B 15/32 131/276 |
| 6,514,511 | B1 | 2/2003 | Thoenes | |
| 8,025,552 | B2 | 9/2011 | Cohen et al. | |
| 2001/0014346 | A1 | 8/2001 | Watkins | |
| 2012/0308686 | A1 | 12/2012 | Wardell et al. | |
| 2015/0305372 | A1* | 10/2015 | Troscher ................ | A23K 50/10 426/2 |
| 2017/0035820 | A1 | 2/2017 | Stamets | |
| 2019/0048307 | A1 | 2/2019 | Morash et al. | |
| 2019/0098876 | A1 | 4/2019 | Kunkel et al. | |
| 2019/0098916 | A1 | 4/2019 | Kunkel et al. | |

FOREIGN PATENT DOCUMENTS

CN         104222626 A       12/2014

OTHER PUBLICATIONS

Bautista: Iaevo-Linalool FEMA 2635; published May 22, 2013. (Year: 2013).*

Alqarni: Food Consumption in Honeybee Colonies; Arab Univ. J. Agric. Sci., Ain Shams Univ., Cairo, 16(1), 203-210, 2008. (Year: 2008).*

Feedipedia: "Blood Meal," <https://www.feedipedia.org/node/221, last updated Mar. 31, 2016, 2 pages., Mar. 31, 2016.

Feedipedia: "Silworm pupae meal," <https://web.archive.org/web/20130707080526/https://www.feedipedia.org/node/199>, last updated May 30, 2013, 4 pages., May 30, 2013.

Nicolson, et al., Nicolson et al. "Honeybees prefer warmer nectar and less viscous nectar, regardless of sugar concentration," Proc Biol Sci, Sep. 22, 2013, 280 (1767), 15 pages., Sep. 22, 2013.

Oliver, , Oliver, "Honeybee Nutrition, Part 4," Bee Culture, The Magazine of American Beekeeping, Apr. 10, 2017, 8 pages., Apr. 10, 2017.

Standifer, et al., Standifer, et al. "Supplemental Feeding of Honey Bee Colonies." 1977. United States Department of Agriculture Information, 11 pages., Jan. 1, 1977.

Aly, Mohamed Z. et al., New Formula of Pollen Supplemental Diets to Study Honey Bee (*Apis mellifera carnica*) Attractiveness, Egyptian Academic Journal of Biological Sciences A. Entomology, vol. 7, No. 2, pp. 47-55, 2014.

Brodschneider, Robert et al., "Nutrition and Health in Honey Bees", Apidologie 41 (2010) 278-294.

Doull, Keith M., "Effects of Attractants and Phagostimulants in Pollen and Pollen Supplement on the Feeding Behaviour of Honeybees in the Hive" Journal of Apicultural Research 13(1) : 47-54 (1974).

Free, J.B. et al., "A Synthetic Pheromone Lure to Induce Worker Honeybees to Consume Water and Artificial Forage", Journal of Apicultural Research 22(4) : 224-228 (1983).

Jones, Warren A., "The Role of Supplementary Feeding in Managed Pollination", Bee Briefs, NSW Agriculture, vol. 10 No. 1, , pp. 5-8, Aug. 1993.

Maliszewska, Renata et al., "Profitability of Pollen Trapping in Poland", Progress of apidology in Poland, ed. Tomasz Cierzniak, Higher School of Pedagogy in Bydgoszcz, 1997, pp. 106-115.

Sagili, Ramesh R. et al., "Effects of Brood Pheromone (SuperBoost) on Consumption of Protein Supplement and Growth of Honey Bee (Hymenoptera: Apidae) Colonies During Fall in a Northern Temperate Climate", Journal of Economic Entomology vol. 105, No. 4, pp. 1134-1138, Aug. 2012.

Sihag, Ram C. et al., "Development of an Artificial Pollen Substitute/Supplement Diet to Help Tide the Colonies of Honeybee (*Apis mellifera* L.) Over the Dearth Season", Journal of Apicultural Science, vol. 55 No. 2, pp. 15-29, 2011.

(Continued)

*Primary Examiner* — Patricia A George

(74) *Attorney, Agent, or Firm* — Dorsey & Whitney LLP

(57) ABSTRACT

The present disclosure describes bee feed products formulated to increase consumption and methods of feeding such products to bees. Feeding methods involve feeding a bee feed composition on an ad libitum basis to bees where the composition contains an amount of a flavor agent that results in increased consumption. The flavor agent may be hydrated with a liquid to form a solution in some examples. The flavor agent may also be mixed directly with the bee feed composition high in protein.

16 Claims, No Drawings

(56) References Cited

OTHER PUBLICATIONS

Somerville, Doug, "Fat Bees Skinny Bees—A Manual on Honey Bee Nutrition for Beekeepers", RIRDC Publication No. 05/054, NSW Department of Primary Industries, 2005.
Crailsheim, K., "The protein balance of the honey bee worker", Apideologie, vol. 21, 1990, 417-429.
Morash, U.S. Appl. No. 62/544,579, filed Aug. 11, 2017; printed Jun. 18, 2019.
Betterbee, "Glossay Beekeeping Terms", https://web.archive.org/web/20101221101842/https://www.betterbee.com/glossary/, Published by Dec. 21, 2010, 6 pages.
Bishop, G.H. et al., "Body Fluids of the Honey Bee Larva II. Chemical Constituents of the Blood, and Their Osmotic", J. Biol. Chem.; 66, 1925, pp. 77-88.
MSE, "Michael Smith Engineers: Approximate Viscosities of Some Common Liquids", https://web.archive.org/web/20160414225555/https://www.michael-smith-engineers.co.uk/resources/useful-info/approximate-viscosities-of-common-liquids-by-type, Published by Apr. 14, 2016, 6 pages.

\* cited by examiner

BEE FEED PRODUCTS AND METHODS OF USING THE SAME

CROSS-REFERENCE TO RELATED APPLICATIONS

This application is filed concurrently with an application entitled "METHODS OF FEEDING BEES FEED PRODUCTS CONTAINING BLOOD MEAL" with Ser. No. 15/724,750; and an application entitled "BEE FEED PRODUCTS AND METHODS OF MAKING AND USING SAME" with 62/568,038, each of which are herein incorporated by reference in their entirety.

TECHNICAL FIELD

Implementations relate to bee feed products and methods of using such products. More particularly, implementations provide protein-rich bee feed compositions comprising a flavor agent, and methods of feeding such compositions to bees.

BACKGROUND

Bees require adequate nutrition for healthy growth and development. Proteins and carbohydrates comprise two of the primary nutritive sources for bees, which are provided naturally in the form of pollen and nectar, respectively. Due to their highly interactive nature, the repercussions of improper nutrition extend beyond individual bees, affecting entire bee colonies. For example, insufficient pollen stores may reduce larval survival rates, thereby diminishing the size of future adult populations and the number of progeny they subsequently produce. Ample supply of proteins and carbohydrates is therefore imperative to the overall survival of bee populations. To ensure that bees receive proper nutrition, especially for commercial bee-keeping and pollination efforts, various artificial bee feed compositions have been developed over time. The ability of these compositions to emulate natural nutritional sources and stimulate consumption, however, remains limited.

SUMMARY

Implementations provide approaches to feeding bees that involve providing a bee feed composition to bees, which contains an amount of a flavor agent that results in the bees increasing consumption of the bee feed composition.

In accordance with some examples of the present disclosure, another method of feeding bees may involve obtaining a bee feed composition high in protein; adding an amount of a flavor agent to the bee feed composition to form a final feed product; and providing the final feed product to bees on an ad libitum basis, where the bees increase consumption of the final feed product in response to the final feed product having the flavor agent.

In some examples, the method may further involve mixing the flavor agent with the bee feed composition high in protein. In some embodiments, the method may involve adding the flavor agent topically in drop-wise fashion to the bee feed composition high in protein. In some implementations, the method may involve mixing the flavor agent with a liquid to form a flavor agent solution. In some examples, the flavor agent solution includes about 0.1% to about 5% of a pure flavor agent by volume of the solution. In some embodiments, the flavor agent includes orange oil, laevo linalool, and methyl anthranilate. In some examples, the ratio of orange oil to laevo linalool to methyl anthranilate is about 60:38:2. In some embodiments, the orange oil, laevo linalool and methyl anthranilate comprise the top three components by volume of the flavor agent. In some implementations, the bees are newly-emerged bees.

Some examples further involve feeding a solution comprised of water and sugar syrup to the bees. Some embodiments may further involve mixing the final feed product with a sugar solution. In some examples, the final feed product is mixed with the sugar syrup solution at a ratio of about 1:2. Some implementations further involve feeding the bees a pollen-based dry feed product. In some embodiments, the bees may increase consumption of the final feed product by about 40% to about 44%.

A bee feed product according to the present disclosure may include a bee feed composition high in protein and an amount of a flavor agent. The flavor agent may be hydrated with a liquid to form a flavor agent solution, which may be mixed directly within the bee feed composition high in protein. In some examples, the amount of the flavor agent is about 0.001% to about 1% by weight of the bee feed product. In some embodiments, the bee feed composition high in protein comprises a dry powder. In some implementations, the bee feed composition high in protein comprises a paste-like substance formed as a patty. In some embodiments, the bee feed composition high in protein includes about 10% to about 30% protein by weight of the bee feed product. In various examples, the flavor agent includes orange oil, laevo linalool, and methyl anthranilate.

DETAILED DESCRIPTION

Protein and carbohydrates comprise two of the major nutritional sources needed for bee survival. Derived from nectar by foraging bees, carbohydrates are stored within bee colonies in the form of honey, which serves as a fuel source necessary to support bees' daily activities and also as a reserve supply for bees during periods of increased energy expenditure. Carbohydrates alone can sustain bees on a temporary basis, but without access to protein, brood rearing slows, activity levels decline, and overall bee longevity is reduced. Pollen provides the only natural protein source for bees and is typically maintained in low, quickly-depleted stores within each bee colony. The importance of replenishing these stores is evidenced by the significant consequences of prolonged protein scarcity. After protein supplies diminish and body reserves are consumed, for example, bees may resort to cannibalizing their own larvae to satisfy their protein requirements. Persistent protein shortages eventually force adult bees to stop producing new progeny altogether, leading to decreases in overall colony population. Therefore, the individual and communal sustainability of bees depends heavily on access to protein in the form of pollen.

Human efforts to support the practice of commercial beekeeping for pollination services may incorporate strategies for providing bees with satisfactory amounts of protein. Diverse bee consumption patterns and unpredictable environmental factors, however, complicate these efforts and limit their effectiveness. For example, variations in diet type, colony size, brood rearing, time of year, and/or the presence of other food sources inside or outside the hive all impact bee protein consumption levels. In addition, age-specific protein demands may vary widely as growing bees develop different organs, glands and bodily structures. Deficiencies in natural pollen supply and quality render unfeasible many attempts to stimulate colony growth using natural pollen harvested from the environment, and supplementing bee diets with pollen from other colonies may expose bees to harmful pathogens. In light of these challenges and the detrimental effects associated with inadequate protein intake, artificial pollen supplements and substitutes have been developed to provide bees with an ample protein supply regardless of environmental conditions.

Artificial pollen formulations may contain many additional ingredients, for e.g., lipids, vitamins and minerals, which are also important to bee development and survival. Despite their comprehensive nutritional content, the inability of these products to convey various natural cues critical to bee feeding behavior results in consistently low consumption levels, thereby allowing protein deficiencies to persist. A nuanced combination of visible, social and chemical stimulants, for e.g., are integral to the feeding process of bees but not captured in preexisting feeds. While chemical attractants have been purified and/or developed to influence bee behavior, their application remains limited to discrete behavioral processes unrelated to feeding. Aromatic compounds contained within these compositions, for example, may illicit natural pheromonal responses in bees. In addition to the absence of environmental cues, low palatability may also contribute to reduced consumption, further confounding the task of formulating a pollen substitute capable of mimicking the allure of natural pollen. Improved pollen alternatives are thus needed to close the gap between the effectiveness of existing feeds and natural pollen.

Applicant's discovery of improved bee feed compositions and methods of feeding bees such compositions is the surprising result of experimenting with the inclusion of various bee attractants and essential oils directly into different protein-rich feed compositions and monitoring their impact on bee consumption. Applicant understood that natural pollen availability varies drastically in different geographic locations during different times of the year, and that an effective artificial pollen feed composition would provide a more stable supply of protein to bees with diminished access to pollen. Applicant also recognized that preexisting pollen supplements and substitutes fail to stimulate robust consumption. Accordingly, Applicant endeavored to develop palatable, protein-rich feed products specially formulated to increase consumption in the absence of natural pollen, as well as methods of feeding such products to bees. Some examples provided herein, for instance, include bee feed products comprised of protein-rich feed compositions mixed with a 1% flavor agent solution. Certain implementations involve adding the flavor agent directly to the feed composition, which may then be provided to bees on an ad libitum basis. Bees fed the flavor agent-supplemented feed products show increased consumption of the feed products compared to identical feed products lacking the flavor agent. By specifically enhancing the consumption of non-pollen-based feeds, the flavor agent-supplemented feed products disclosed herein comprise effective pollen substitutes.

Bee Feed Products

The final bee feed products disclosed herein may comprise a bee feed composition mixed with a flavor agent. The final feed products may contain high levels of protein. When mixed with bee feed compositions according to the methods disclosed herein, the flavor agent may cause bees to increase consumption of the feed.

The flavor agent may be provided as a composition with varying properties. In some examples, the pure form of the flavor agent may comprise a mixture of components, which may include at least one essential oil. In some examples, the flavor agent may include orange oil, laevo linalool, and/or methyl anthranilate. Among the flavor agent components, orange oil, laevo linalool and methyl anthranilate may be the top three components, by weight percentage and/or volume. The ratio of these three components may vary. For example, the ratio of orange oil to laevo linalool to methyl anthranilate may be about 60:38:2.

In various embodiments, the amount of orange oil relative to the other two top components may range from about 50:50 to about 70:30. In addition or alternatively to orange oil, the flavor agent may include neroli oil and/or petitgrain.

The amount of laevo linalool relative to the other two top components may range from about 30:70 to about 50:50. In addition or alternatively to laevo linalool, the flavor agent may include licareol, ho wood oil, rosewood oil, and/or coriandrol.

Methyl anthranilate, which has been utilized as a bird repellant in unrelated products, may be included at a ratio of about 1:99 to about 10:90 relative to the other two top components. In addition or alternatively to methyl anthranilate, the flavor agent may include anthranilic acid and/or dimethyl anthranilate. In various embodiments, the flavor agent may exclude neroli oil, petitgrain, licareol, ho wood oil, rosewood oil, coriandrol, anthranilic acid, and/or dimethyl anthranilate.

The flavor agent composition may comprise a liquid or a dry, powder-like substance. The pure flavor agent content of the flavor agent composition may vary depending on the processes used to manufacture the flavor agent composition, the sources of flavor agent used, and/or the desired effect of the flavor agent. In embodiments where the flavor agent composition comprises a liquid, the pure flavor agent content may range from about 70% to about 100%, about 80% to about 100%, about 85% to about 100%, about 90% to about 100%, about 93% to about 100%, about 95% to about 99.99%, or about 97% to about 99.99% by volume of the flavor agent composition. In embodiments where the flavor agent composition comprises a dry, powder-like substance, the pure flavor agent content may range from about 70% to about 100%, about 80% to about 100%, about 85% to about 100%, about 90% to about 100%, about 93% to about 100%, about 95% to about 99.99%, or about 97% to about 99.99% by weight of the flavor agent composition.

The flavor agent compositions used herein may be admixed with various other components to dilute the flavor agent concentration, facilitate thorough incorporation of the flavor agent into the feed composition, and/or provide the flavor agent in a form conducive to consumption by bees. In some embodiments, the flavor agent composition may be admixed with a liquid to form a homogenous flavor agent solution. In such cases, the flavor agent solution may comprise a flavor agent composition, in liquid or dry form, mixed with various liquids, e.g., vegetable oil, syrup, and/or water. The final flavor agent content of the flavor agent solution may range from about 0.1% to about 20%, about 0.1% to about 15%, about 0.1% to about 10%, about 0.1% to about 7%, about 0.1% to about 5%, about 0.5% to about 1.5%, about 1% to about 3%, or about 1.5% to about 2.5% by volume of the flavor agent solution.

The bee feed composition mixed with the flavor agent may be protein-based in some embodiments, and may contain a mixture of spray dried blood meal (e.g., animal or avian-based blood meal, such as poultry blood meal), brewer's yeast, and essential vitamins and minerals. The bee feed composition may be produced according to various methods. In some embodiments, the feed composition may be in the form of a dry powder. In other embodiments, the dry powder may be mixed with a liquid solution, e.g., sugar syrup, to produce a dough-like substance having greater moisture content, which may be formed into individual patties in some examples. In some embodiments, the dry powder may be mixed with a liquid solution at a ratio of about 1 part dry powder to about every 1, 1.3, 1.5, 1.7, 2, 2.5, 3, 3.5, 4, 4.5, 5, 6, 7, 8, or 9 parts liquid solution, forming a paste-like composition or in some examples, a liquid feed.

The bee feed compositions may contain high levels of protein and may therefore be considered protein-rich feed compositions. The protein content may vary depending on whether the final feed product serves as a pollen supplement or pollen substitute, as pollen substitutes may contain higher levels of protein than pollen supplements. Protein may be obtained from numerous sources including but not limited to: algae, blood, soy isolates, and/or any mixture thereof. Regardless of the specific source(s), the protein may comprise one or more of the 10 amino acids essential to the honey bee diet, including but not limited to: methionine, tryptophan, arginine, lysine, histidine, phenylalanine, isoleucine, threonine, leucine and valine. In some embodiments, the total protein content by weight of the feed composition may range from about 1% to about 30%, about 5% to about 25%, about 10% to about 25%, about 15% to about 25%, or about 18% to about 22%.

Because natural pollen also serves as a major source of lipids to bees, the feed compositions disclosed herein may comprise lipids in an amount sufficient to fulfill the lipid requirement of bees. Fat sources in the feed composition may include, but are not limited to: various edible oils, e.g., vegetable oils, encapsulated essential oils, medium chain fatty acids, sterols, and/or propionic acid. The total fat content by weight of the feed composition may range from about 0.1% to about 10%, about 0.1% to about 7%, about 1% to about 5%, or about 1% to about 3% in some examples.

Vitamins, micronutrients and macronutrients may also be included in the feed compositions and may include, but are not limited to: calcium, phosphorus, sodium, Sulphur, selenium, vitamin C, vitamin A, potassium, vitamin B-12, vitamin D, vitamin K, folic acid, and/or biotin. Vitamins, micronutrients and macronutrients may be present in the feed compositions in various amounts, ranging from about 0.01% to about 1% by weight of the feed composition in various examples.

By providing a variety of nutrients, the foregoing feed components provide nutritional diversity usually obtained only through natural foraging behavior. The embodiments are not limited to these nutritional components, however, and may contain a large variety of other nutrient combinations in various amounts. The feed components listed here that are not critical to the proper formation of protein-rich feed products for bees can be substituted or omitted.

The final feed products used to feed bees according to the methods herein may comprise a protein-rich bee feed composition mixed with a flavor agent, which may comprise a flavor agent composition in dry or liquid form. The pure flavor agent content of the final feed products may vary and may be adjusted according to the nutritional demands of the bees and/or the feeding location. The amount and/or concentration of the flavor agent composition added to the feed composition may be increased or decreased as necessary to adjust the flavor agent content of the final feed product. In one exemplary embodiment, about 2 drops of flavor agent solution at approximately 2% by volume of pure flavor agent may be present in a final feed product that serves as the sole protein source for about 45 to about 100 bees over a 7-day period. In some embodiments, the flavor agent concentration of the final feed product may be about 0.001% to about 2%, about 0.001% to about 1%, about 0.001% to about 0.5%, about 0.001% to about 0.1%, or about 0.001% to about 0.01% by weight of the final feed product.

Methods of Feeding Bees

Methods of feeding bees may involve feeding the bees feed products containing a flavor agent. This approach may involve obtaining a flavor agent composition and combining it with a feed composition just prior to feeding. Alternatively, the feed composition may contain the flavor agent. In other embodiments, the flavor agent composition may be mixed with a liquid to form a solution, which is then admixed with the feed composition. The feed composition may be high in protein. Bee feed products supplemented with a flavor agent and optionally hydrated may comprise final feed products that may stimulate increased bee feed consumption.

Generally, bees are fed in a group setting. In some embodiments, the bees may be confined to cages, boxes or crates. In alternative embodiments, the bees may be unconfined and free to roam. Accordingly, the feeding methods disclosed herein may utilize a variety of feeding apparatuses placed in various locations. In some embodiments, the bee feed products may be applied directly on natural objects, e.g., plants, to provide the bees with feed products in their natural environment. In other embodiments, the bee feed products may be provided in one or more strategically-selected locations to stimulate movement of the bees as desired. In still other embodiments, the bee feed products may be placed in one or more locations where pollen sources are scarce. In addition or alternatively, methods of feeding may incorporate apparatuses that visually emulate pollen-producing plants.

Bees may be fed on ad libitum basis. The total amount of feed provided for bees at any one time may vary depending on the number of bees being fed, the time of year, and/or the availability of other sources of artificial or natural pollen. In some embodiments, the final feed products disclosed herein may comprise all or a portion of the bees' daily feed ration. In some embodiments, groups of about 60 to about 120 bees may be provided with about 0.1 to about 10 grams, about 0.2 to about 9 grams, about 0.3 to about 8 grams, about 0.4 to about 7 grams, about 0.5 to about 5 grams, about 0.5 to about 3 grams, about 0.5 to about 2 grams, about 1 to about 5 grams, or about 2 to about 3 grams of feed per week. In other embodiments, an entire colony may be provided with about 0.1 to about 5 lbs., about 0.2 to about 4 lbs., about 0.3 to about 3 lbs., about 0.4 to about 2.5 lbs., or about 0.5 lbs. to about 2 lbs. of feed per week.

Prior to feeding the bees and in addition to flavor agent supplementation, dry feed compositions may be mixed with water and/or one or more additional liquids, e.g., sugar syrup. Mixing the dry feed with one or more liquids prior to feeding may be advantageous for feeding bees in outdoor environments, for example, where dry feed powder may be more vulnerable to wind.

Whether provided as a concentrated composition or diluted solution, flavor agent may be added to feed compositions prior to feeding. Flavor agent addition may be performed in various ways and/or at different times during the feeding process. In some embodiments, the flavor agent may be incorporated directly into the feed composition as an ingredient thereof. In one some examples, the flavor agent may be mixed integrally with the feed composition after the feed composition has been hydrated with an aqueous substance, such as sugar syrup. In other embodiments, the flavor agent may be added topically to a dry feed composition in drop-wise fashion, followed by optional mixing.

The amount of flavor agent that is combined with the feed composition may vary based on the number of bees relying on the feed, the size of the area occupied by the bees, whether the feed is placed indoors or outdoors, the age of the bees, the time of year, and/or the availability of other sources of artificial or natural pollen. Flavor agent levels may be increased to correct bee protein deficiencies, amplify brood size, and/or generally boost consumption of various feed compositions.

The inclusion of flavor agent into protein-rich feed compositions according to the present disclosure has been found to increase consumption of the feed. In particular, flavor agent supplementation specifically causes increased consumption of protein-rich feed compositions in which the protein source is not natural pollen. Accordingly, the methods of feeding disclosed herein stimulate bee feeding behavior previously incited only by pollen.

Because increased feed consumption of protein-rich feed may result from feeding bees according the methods disclosed herein, bees may not require additional sources of protein to supplement their diet. In alternative embodiments, however, other protein sources may still be provided to bees to augment total protein intake. In these embodiments, protein may be derived from natural pollen sources and/or artificial pollen formulations. In still other embodiments, bees may be weaned from alternative protein sources in favor of the flavor agent-supplemented feed disclosed herein. In such cases, the amount of flavor agent-supplemented feed offered to bees may be increased as access to alternative protein sources is decreased until the bees' primary or sole source of protein consists of the flavor agent-supplemented protein-rich feed of the present disclosure. In other embodiments, bees may be provided with flavor agent-supplemented feed during certain times of each year, e.g., in the winter when natural pollen is scarce or non-existent. In other embodiments, bees may be provided with flavor agent-supplemented feed during periods when bee pollination activity is needed for commercial pollination services. Accordingly, feed rates may vary. Feed rates for bees fed according to the methods disclosed herein may range from about 0.001 to about 0.05 grams, about 0.001 to about 0.04 grams, about 0.001 to about 0.03 grams, about 0.001 to about 0.02 grams, about 0.005 to about 0.015 grams, or about 0.007 to about 0.011 grams per bee per week. By feeding bees according to the methods disclosed herein, feed intake rates may increase by about 20% to about 60%, about 25% to about 55%, about 30% to about 50%, about 35% to about 50%, about 40% to about 48%, or about 44% compared to bees fed identical feed compositions but without the flavor agent. Increased feed intake rates may be observed in as little as 24 hours in some embodiments.

The methods disclosed herein may be used to feed adult bees, beginning immediately after emergence from the larval cell. In some embodiments, bees may be fed according to these methods beginning at about 0, 1, 2, 3, 4 or 5 or more days after emergence. Bees may continue to be fed according to these methods for the duration of their life span or for shorter, finite periods. Bees may be fed over the entirety of any of the aforementioned periods or for intermittent spans of time falling within or overlapping with these periods. Bees may be fed on a daily, weekly or monthly basis. Alternatively, bees may be fed irregularly and/or upon total consumption of the feed products. Bees may be fed in a lab setting or a field setting.

In addition to protein-rich feed, dry and/or liquid feed compositions containing high amounts of carbohydrates, e.g., sugar, may be fed concurrently to bees according to the methods disclosed herein. The amount of carbohydrate feed provided to bees may be adjusted according to activity levels. In some embodiments, the carbohydrate feed may be offered to the bees on an ad libitum basis. Carbohydrate feed may include high fructose corn syrup, liquid sucrose, sucrose mixed with water, and/or honey.

Implementations of the present disclosure are more particularly described in the following bee trials for illustrative purposes only. Numerous modifications and variations are within the scope of the present disclosure as will be apparent to those skilled in the art.

EXAMPLE 1

This study was conducted to assess the efficacy of a flavor agent on the consumption of protein-rich bee feed compositions when fed to bees using the disclosed methods. By offering each group of test bees with two supplies of feed, differing only by the presence of a 1% flavor agent solution in the feed, and measuring consumption over the duration of the study, it was determined whether the flavor agent was able to increase consumption of the feed.

Patties were mixed up into two batches, a test batch containing a flavor agent mixed directly into a bee feed composition, and a control batch containing the same bee feed composition but with no flavor agent. Each patty comprised a bee feed composition mixed with syrup and formed as a single mass into a cohesive dough-like feed product with variable shape. The flavor agent included in the test batch included over 20 components, the most abundant components being orange oil, laevo linalool, and methyl anthranilate at a ratio of about 60:38:2 relative to each other. The feed composition used for the patties comprised a dry material containing no less than 38.3 wt % protein, 2 wt % fat, 8 wt % fiber, 3 wt % ash, and 10 wt % moisture. The specific feed components included plant protein products, processed grain by-product, citric acid, potassium sorbate and sodium propionate (preservatives). After the feed composition was mixed with syrup at a ratio of about 1:1 to form patties, corn syrup comprised about half of each patty by weight, such that the final patty feed products contained about 19 wt % protein, about 1 wt % fat, about 4 wt % fiber, about 1.5 wt % ash, and about 20 wt % moisture. Due to its high protein content, the bee feed composition comprising the patties may be considered a pollen substitute. The patties were placed side by side in full size bee colonies directly on top of the bee frames, under the lid, for a period of 24 hours. Patties were weighed prior to placement in the colony and then again when removed from the colony 24 hours later. The mean feed intake for each colony is provided in Table 1.

TABLE 1

Mean intake of diets with and without flavor agent (grams)

| Diet | Mean intake (grams) | Standard Error |
|---|---|---|
| flavor agent | 25.27 | 1.7395 |
| control | 17.575 | 1.1228 |

Means differ, P < .05

The data in Table 1 shows that adding a flavor agent to a pollen substitute product increases the consumption of the product. The proprietary feed containing a flavor agent, for instance, showed an average consumption increase of about 44% compared to the same feed composition not supplemented with the flavor agent. Therefore, the results indicate that the addition of a flavor agent to protein-rich feed products specifically impacts the consumption of feed compositions formulated as pollen substitutes.

As used herein, the term "about" modifying, for example, the quantity of a component in a composition, concentration, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities.

Similarly, it should be appreciated that in the foregoing description of example embodiments, various features are sometimes grouped together in a single embodiment for the purpose of streamlining the disclosure and aiding in the understanding of one or more of the various aspects. These methods of disclosure, however, are not to be interpreted as reflecting an intention that the claims require more features than are expressly recited in each claim. Rather, as the following claims reflect, inventive aspects lie in less than all features of a single foregoing disclosed embodiment, and each embodiment described herein may contain more than one inventive feature.

Although the present disclosure provides references to preferred embodiments, persons skilled in the art will recognize that changes may be made in form and detail without departing from the spirit and scope of the invention.

What is claimed is:

1. A method of feeding bees, the method comprising:
   providing a bee feed composition to bees on an ad libitum basis,
   wherein the bee feed composition comprises an amount of a flavor agent,
   wherein the flavor agent comprises orange oil, laevo linalool, and methyl anthranilate,
   wherein a ratio of orange oil relative to a combination of laevo linalool and methyl anthranilate ranges from about 50:50 to about 70:30,
   wherein the bees increase consumption of the bee feed composition in response to the flavor agent in the bee feed composition.

2. The method of claim 1, wherein a ratio of orange oil to laevo linalool to methyl anthranilate in the flavor agent is about 60:38:2.

3. The method of claim 1, wherein the bee feed composition comprises about 1 wt % to about 30 wt % protein.

4. The method of claim 1, wherein prior to providing a bee feed composition to bees, the flavor agent is added topically in drop-wise fashion to the bee feed composition.

5. The method of claim 1, wherein prior to the step of providing, further comprising the step of mixing the flavor agent with a liquid to form a flavor agent solution.

6. The method of claim 5, wherein the flavor agent solution comprises about 0.1% to about 5% of a flavor agent by volume of the solution.

7. The method of claim 1, wherein the bees are newly-emerged bees.

8. The method of claim 1, wherein the bee feed composition further comprises a liquid sugar solution.

9. The method of claim 1, further comprising feeding the bees a pollen-based dry feed product.

10. The method of claim 1, wherein the bees increase consumption of the bee feed composition by about 40% to about 44%.

11. The method of claim 1, wherein the bee feed composition is in a liquid form or a patty form.

12. A bee feed product comprising:
    a bee feed composition high in protein; and
    an amount of a flavor agent, the flavor agent comprising orange oil, laevo linalool, and methyl anthranilate,
        wherein a ratio of orange oil relative to a combination of laevo linalool and methyl anthranilate ranges from about 50:50 to about 70:30,
        wherein the flavor agent is hydrated with a liquid to form a flavor agent solution, and
        wherein the flavor agent solution is mixed directly with the bee feed composition high in protein.

13. The bee feed product of claim 12, wherein the amount of the flavor agent is about 0.001% to about 1% by weight of the bee feed product.

14. The bee feed product of claim 12, wherein the bee feed composition high in protein comprises a dry powder.

15. The bee feed product of claim 12, wherein the bee feed composition high in protein comprises a paste-like substance formed as a patty.

16. The bee feed product of claim 12, wherein the bee feed composition high in protein comprises about 10% to about 30% protein by weight of the bee feed product.

* * * * *